Figure 1:
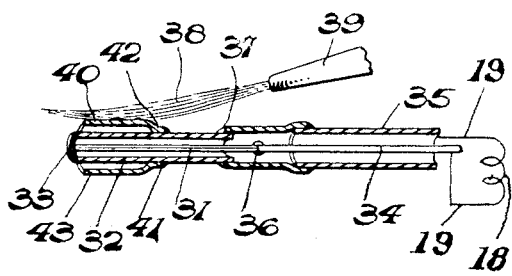

May 14, 1946.  P. L. BETZ  2,400,384
THERMOELECTRIC GENERATOR AND CIRCUIT
Filed Dec. 27, 1941

Inventor
Paul L. Betz
By Cameron, Kerkam & Sutton
Attorneys

Patented May 14, 1946

2,400,384

UNITED STATES PATENT OFFICE 2,400,384

THERMOELECTRIC GENERATOR AND CIRCUIT

Paul L. Betz, Baltimore, Md., assignor to Consolidated Gas Electric Light and Power Company of Baltimore, Baltimore, Md., a corporation of Maryland Application December 27, 1941, Serial No. 424,652

13 Claims. (Cl. 175—335)

This invention relates to thermoelectric generators and circuits, and more particularly to an improved thermocouple and the method of predetermining its operating characteristics.

Until recently, the main use of thermocouples has been in measuring temperature. Research over many years has developed a number of alloys capable of producing relatively high electromotive forces as well as withstanding relatively high temperatures. In temperature measuring devices the cold junctions are usually maintained at some known reference temperature and the temperature indication of the thermocouple is determined with reference to such cold junction temperature.

Recently there has been a relatively great expansion in the use of thermocouples as power generating devices rather than as accurate temperature measuring devices, particularly in the development of safety devices which depend on a thermocouple as a source of operating energy. Flow controlling valves are now used commercially wherein the valves are opened manually and retained open as long as a proper supply of energy is received by an electromagnetic device from a thermocouple subjected to a source of heat. Relay devices are also obtainable which assume one position under the influence of an electromagnet energized by a thermocouple and which assume another position when the thermocouple energy is reduced to a predetermined value.

The use of thermocouples as power generators has presented new problems in the arrangement of the thermoelements and in the control of their operation. For example the rate at which the current decays upon reduction or failure of the source of heat becomes an important factor in the operation of the safety device. In Patent No. 2,097,838 to Sebastian Karrer the cold junction of the thermocouple is disclosed as provided with means to effect a reversal of the generated voltage when heating of the hot junction is discontinued, and the effect of means ultimately causing current reversal has been shown to increase the rate of decay of the thermoelectric current even before actual current reversal is attained. Accordingly, when a thermocouple made in conformity with the Karrer invention is employed the action of the safety devices is more rapid than when ordinary thermocouples are employed.

The present invention has for its object the provision of a novel method of constructing a thermocouple whereby upon extinction of the actuating flame a much larger reversed voltage and hence current can be secured to cause a more rapid decay of current in the thermoelectric device than has previously been the case.

Heretofore in applying thermocouples to safety devices the object has been to obtain a maximum voltage output from the thermocouple. This has been achieved by so applying the actuating flame that the maximum temperature of the thermocouple occurs at the hot junction. In conformity with the present invention, on the other hand, the heat of the actuating flame is applied to one of the thermoelectric elements intermediate of its thermojunctions at a predetermined location with respect to the extremities of the element, and the thermoelements are so chosen as to provide a relatively rapid decay of the current in the electromagnetic device by producing a relatively large reverse current.

The invention is capable of receiving a variety of expressions, as diagrammatically illustrated on the accompanying drawing, but it is to be expressly understood that the drawing is for purposes of illustration only and not to be construed as a definition of the limits of the invention.

Figure 2:
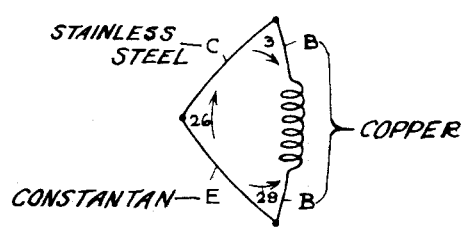

Referring in detail to the drawing:

Fig. 1 is a diagrammatic view of a thermocouple embodying the present invention; and Fig. 2 is a diagrammatic view illustrating the principles to be applied in embodying the present invention.

In Fig. 1 a thermocouple is illustrated in which the thermoelements consist of a rod-like member 31 and a tubular member 32 providing a hot junction at 33 where the thermoelements 31 and 32 are joined in any suitable way as by welding. Leads 34 and 35, the latter in the form of a concentric tubular lead, are attached to the thermoelements 31 and 32, respectively, forming cold junctions at 36 and 37. Leads 34 and 35 may be connected to any suitable operating or controlling device, such as a safety device as heretofore referred to, being diagrammatically indicated by the electromagnet coil 18 connected to leads 34 and 35 by leads 19. As here shown, the actuating flame 38 issuing from any suitable burner 39 impinges on a member 40 attached to the outer cylindrical thermoelement 32 in any suitable way as by welding at 41, the point of attachment of member 40 to the thermoelement 32 being intermediate the hot junction 33 and the cold junction 37. Member 40 may be of any suitable construction, being shown as consisting of a section 42 which closely fits tubular thermoelement 32 and also a section 43 which is of greater diameter than element 32 and of sufficient length to prevent the actuating flame 38 from touching said element 32. Heat derived by member 40 from the flame 38 flows to the attaching portion 42 of member 40, and therefrom to the thermoelement 32 intermediate its junctions 33 and 37. While in this embodiment the thermoelements are indicated as of substantially the same length, they may be made of materially different lengths.

In the present invention heat is applied from the actuating flame to one of the elements of the thermocouple intermediate the hot and cold junctions of that element. By suitably selecting the point of attachment of the heat receiving element to said thermoelement the steady running voltage generated by the thermocouple, for a fixed rate of heat input, can be controlled. In the construction illustrated, a change in the point of attachment of member 40 to the thermoelement 32 changes the equilibrium value of the generated voltage for a given rate of heat input. Experimentally it has been demonstrated that the steadily generated voltage for a particular thermocouple of the type shown may be varied as desired through a range of from zero to ten millivolts by properly locating the point at which heat is applied intermediate the ends of one of the thermoelements.

In accordance with the present invention the proper thermoelement to receive heat intermediate its extremities and proper thermoelements to be associated therewith for securing the desired thermocouple characteristics may be determined in conformity with the principles now to be explained and illustrated by the following procedure:

Step I

Wires of the various thermoelements under consideration are twisted together at one end and arranged so that they form a common hot junction and may be brought to the same elevated temperature, preferably a temperature close to that at which the thermocouple will operate under service conditions. Pair combinations of the various thermoelements are made and the generated voltages and polarities thereof are determined by means of a potentiometer. The terminals of the potentiometer form the cold junctions of the thermocouple pair combinations. The one thermoelement is determined that is positive, i. e., to which current will flow at the hot junction, with respect to all of the other thermoelements under consideration and the voltage generated by each of the other thermoelements with respect to this one thermoelement is determined. For convenience, these data are arranged in the order of increasing thermal voltages, whereupon any thermoelement in the list is positive with respect to other thermoelements that fall beneath it in the list. A similar arrangement of thermoelectric data may be made from published data, as for example see "Pyrometric practice," Bureau of Standards Technologic Paper No. 170 (1921), pp. 306, 307. By way of illustration, consider a group of five thermoelements which includes Chromel-P, copper, stainless steel, Alumel and Constantan. In determining the thermoelectric voltage generated as above explained no high degree of accuracy is necessary, it being sufficient to determine the generated voltage to the nearest millivolt. Of this group of thermoelements, Chromel-P is found to be positive with respect to the others and the voltages may be arranged as outlined above and as given in Table I, the voltage recorded being obtained when using a differential on the order of 500° C. between the hot and cold junctions.

*Table I*

| Thermoelement | Voltage generated against thermoelement A in millivolts |
|---|---|
| (A) Chromel-P | |
| (B) Copper | 9 |
| (C) Stainless steel | 12 |
| (D) Alumel | 20 |
| (E) Constantan | 38 |

Step II

Having obtained the thermoelectric data outlined in Step I, it is necessary to determine which thermoelement forming the nominal hot junction of a given combination of thermoelements in a thermoelectric circuit is to receive heat intermediate its extremities in accordance with the present invention. This step can best be understood by referring to a specific case. Take for example, the thermoelectric circuit illustrated schematically in Fig. 2 and consisting of a nominal hot junction between thermoelements of stainless steel C and Constantan E and nominal cold junctions between stainless steel C and copper B and Constantan E and copper B. Considering these junctions separately in view of the data given in Table I under Step I, it is apparent that the voltage generated by the nominal hot junction is 26 millivolts, this being the difference between 38 and 12 millivolts, the voltages generated by Constantan and stainless steel, respectively, against Chromel-P as a reference.

Considering the nominal cold junction in Fig. 2 between stainless steel C and copper B, the voltage generated at this junction under the conditions outlined in Step I is 3 millivolts, being the difference between 12 and 9 millivolts generated by these thermoelements, respectively, against Chromel-P.

Likewise, considering the nominal cold junction in Fig. 2 between Constantan E and copper B, the voltage generated under the conditions of Step I is 29 millivolts, being the difference between 38 millivolts for Constantan vs. Chromel-P and 9 millivolts for copper vs. Chromel-P. These voltage relationships are indicated on Fig. 2.

Considering the polarity relationships given in Table I for the various junctions in the example under consideration in Fig. 2, it is seen that for the nominal hot junction between Constantan and stainless steel the stainless steel is positive with respect to Constantan. Therefore, the polarity of the generated voltage is such that a current would flow at this junction in the direction from Constantan to stainless steel. At the nominal cold junction between stainless steel and copper, copper is positive with respect to stainless steel and the polarity of the generated voltage is such that the direction of current flow at this junction would be from stainless steel to copper. The polarity of the generated voltage at the other nominal cold junction between Constantan and copper is such that current would flow from Constantan to copper at this junction. The arrows in Fig. 2 indicate the polarity relationships just referred to. It should be noted that the directions of current flow and the magnitude of voltages generated at the various junctions are determined from the data outlined in Table I, and are therefore determined under conditions that are not representative of conditions existing in a given thermocouple under normal usage where the nominal cold junctions operate at relatively low temperatures and the nominal hot junction operates at a relatively high temperature.

STEP III

Having carried out the operations outlined under Steps I and II and as exemplified for a particular combination of thermoelements in Fig. 2, the present invention provides a method for determining which thermoelement associated with the hot junction of the combination under consideration is to receive heat intermediate of its extremities. The invention provides that under operating conditions heat be applied to the thermoelement in which the polarities of the generated voltages at its extremities oppose each other under the conditions established in Step II and illustrated in Fig. 2. In addition to this, the thermoelement to be so heated is further identified as being that member for which the ratio of the voltages generated at its extremities (as established under Step II and as illustrated in Fig. 2) is of the order of 0.5 or greater where the numerator of the ratio is always the lower value of the two generated voltages. In other words, one should not be more than twice the other. Thus, in the example under consideration, the Constantan thermoelement meets these requirements in so far as the voltages at its extremities are oppositely directed and the ratio of these voltages $$\left(\frac{26}{29}\right)$$

is 0.9, which meets the requirement that the ratio be on the order of 0.5 or greater.

By way of further example of another combination of thermoelements listed in Table I, assume that Chromel-P and Constantan are used to form the nominal hot junction and that copper is used as the third metal to form the nominal cold junctions. If the present invention be now practiced according to Step III the difference between Chromel-P and Constantan taken from Table I is 38 millivolts, the difference between Chromel-P and copper is 9 millivolts, and the difference between Constantan and copper is 29 millivolts. It therefore becomes apparent that the Constantan thermoelement meets the requirements of the present invention insofar as the voltages at its extremities are oppositely directed and the ratio of these voltages $$\left(\frac{29}{38}\right)$$

is 0.76, which again meets the requirement that the ratio be on the order of 0.5 or greater. As will be apparent to those skilled in the art like calculations may be carried on to apply the invention with other combinations of thermoelectric elements listed in Table I.

The effectiveness of the thermocouple of the present invention to produce an increased reversed voltage, and hence current reversal upon extinction of the actuating flame is illustrated by the following comparative figures.

A thermocouple used commercially to actuate safety devices comprises an outer tubular thermoelement of stainless steel approximately one inch long and an inner thermoelement of Constantan joined to form a hot junction and connected to copper leads to form the cold junctions. This structure which is similar to that described in Patent No. 2,126,564 of Oscar J. Leins, was found to generate a maximum reversed voltage of 0.18 millivolt upon extinction of the actuating flame. According to the present invention a thermocouple was constructed using the same materials as in the commercial thermocouple referred to above, i. e., stainless steel, Constantan and copper. This improved thermocouple consisted of an outer tubular thermoelements of Constantan approximately one inch long (32 in Fig. 1), an inner thermoelement of stainless steel (31 in Fig. 1) and connected to copper leads (34, 35 in Fig. 1) at the cold junctions (36, 37 in Fig. 1). The actuating flame was applied in conformity with the present invention, as illustrated in the figures, in which case heat was applied to the Constantan thermoelement (32 in Fig. 1) intermediate the junctions at its extremities, as at 41 in Fig. 1. The improved thermocouple produced a maximum reversed voltage on cooling of 4.0 millivolts, i. e., on the order of a 20 fold increase in reversed voltage over the commercial thermocouple heretofore employed. In this improved thermocouple the shielding afforded the inner cold junction by the closed construction (which is relied upon in the above referred to patent to Leins), was not responsible for the reversal of the improved thermocouple inasmuch as the voltage generated at the inner junction was in the same direction as that generated at the hot junction. The explanation of the reversal of the improved thermocouple lies in the more rapid rate of cooling of the hot junction over that of the outer cold junction, due to such causes as the cooling effect of unignited gas impinged on the hot junction, lower heat capacity of the hot junction than of the outer cold junction, and the fact that the cold junction generates a relatively large opposed voltage.

It will therefore be perceived that by the present invention a novel thermocouple and method of constructing the same to predetermine its operating characteristics has been provided whereby a greatly increased current reversal may be obtained without need for special provision at a cold junction as heretofore used, while the steady running voltage for a given heat input may be nicely determined. Thus the operating characteristics of the thermocouple may be predetermined with accuracy and the rate of current decay, when the source of heat is removed from the thermocouple, may be greatly increased to expedite the rate of current decay in the electromagnet and thus the operation of the safety device or other means under the control of the thermoelectric current.

While the embodiments of the present invention have been described with considerable particularity by way of illustration to exemplify the invention, and particular materials, particular magnitudes of voltage and particular combinations of thermoelements have been referred to, it is to be expressly understood that the invention is not limited to such structures, materials, magnitudes or arrangements, as the present invention may be carried out, through application of the principles above explained, in a wide variety of structures and combination of thermoelements to obtain the desired operating characteristics. Reference is therefore to be had to the appended claims for a definition of the invention.

What is claimed is:

1. A thermocouple circuit comprising three elements of dissimilar metals, one of said elements including an electromagnetic coil adapted to transfer electromagnetic energy to an associated control device, another of said elements being tubular and the other of said elements being rodlike, said tubular element enclosing said rodlike element, a contiguous extremity of said tubular and rodlike elements being united to provide a norminal hot junction and the junctions of said tubular and rodlike elements with said first named element forming nominal cold junctions, said tubular element being formed of a metal that will effect a predetermined reversal of voltage upon cessation of heat input, and a source of heat input to said thermoelectric circuit cooperatively associated with said tubular element only at a point intermediate of its extremities.

2. A thermocouple for supplying energy to a copper circuit including an electromagnet winding comprising a tubular Constantan thermoelement which encloses a Chromel thermoelement, a contiguous extremity of each of said thermoelements being united to provide a nominally hot junction, the other extremity of each of said thermoelements being connected to said copper circuit and providing nominally cold junctions, the said tubular thermoelement having a source of heat input associated therewith only at a point intermediate of its extremities and the point of association being predetermined to produce the desired operating characteristics upon discontinuance of said flame.

3. A thermocouple for supplying energy to a copper circuit including an electromagnet winding comprising a tubular Constantan thermoelement which encloses a stainless steel thermoelement, a contiguous extremity of each of said thermoelements being united to provide a nominally hot junction, the other extremity of each of said thermoelements being connected to said copper circuit and providing nominally cold junctions, the said tubular thermoelement having a source of heat input associated therewith only at a point intermediate of its extremities and the point of association being predetermined to produce the desired operating characteristics upon discontinuance of said flame.

4. A thermocouple connected to an energy-receiving circuit, comprising a tubular thermoelement and a second thermoelement, said elements having a nominal hot junction between the extremities thereof, said tubular thermoelement enclosing said second thermoelement, the said thermoelements forming nominal cold junctions at their other extremities in cooperation with said energy-receiving circuit, the nominal cold junction of the said tubular thermoelement enclosing the nominal cold junction of the said second thermoelement, the said tubular thermoelement having a source of heat input associated therewith only at a point intermediate the extremities of said tubular element and having its nominal hot junction of such materials that when heated to a given temperature the voltage generated by said nominal hot junction is opposite in direction to the voltage generated by the nominal cold junction of the said tubular thermoelement when heated to the said given temperature and the ratio of the smaller to the larger voltage is on the order of at least 0.5.

5. A thermocouple connected to an energy-receiving circuit comprising a tubular thermoelement and a second thermoelement, said elements having a nominal hot junction between the extremities thereof, said tubular thermoelement enclosing said second thermoelement, the said tubular and second thermoelements being of approximately the same length and having nominal cold junctions at their other extremities in cooperation with said energy-receiving circuit, the nominal cold junction of the said tubular thermoelement enclosing the nominal cold junction of the said second thermoelement, the said tubular thermoelement having a source of heat input associated therewith only at a point intermediate the extremities of said tubular thermoelement and having its nominal hot junction of such materials that when heated to a given temperature the voltage generated by said nominal hot junction is opposite in direction to the voltage generated by the nominal cold junction of the said tubular thermoelement when heated to the said given temperature and the ratio of the smaller to the larger voltage is on the order of at least 0.5.

6. A thermocouple connected to an energy-receiving circuit comprising a tubular thermoelement and a second thermoelement, said elements having a nominal hot junction between the extremities thereof, said tubular thermoelement enclosing said second thermoelement, the said thermoelements forming nominal cold junctions at their other extremities in cooperation with the said energy-receiving circuit, the nominal cold junction of the said tubular thermoelement enclosing the nominal cold junction of the said second thermoelement, the said tubular thermoelement having a heat receiving and conducting means in heat conducting relationship therewith only intermediate its extremities and having its nominal hot junction of such materials that when heated to a given temperature the voltage generated by the said nominal hot junction is opposite in direction to the voltage generated by the nominal cold junction of the said tubular thermoelement when heated to the said given temperature and the ratio of the smaller to the larger voltage is on the order of at least 0.5.

7. A thermocouple connected to an energy-receiving circuit comprising a tubular thermoelement and a second thermoelement, said elements having a nominal hot junction between the extremities thereof, said tubular thermoelement enclosing said second thermoelement, the said tubular and second thermoelements being of approximately the same length and having nominal cold junctions at their other extremities in cooperation with said energy-receiving circuit, the nominal cold junction of the said tubular thermoelement enclosing the nominal cold junction of the said second thermoelement, the said tubular thermoelement having a heat receiving and conducting means in heat conducting relationship therewith only intermediate its extremities and having its nominal hot junction of such materials that when heated to a given temperature the voltage generated by the said nominal hot junction is opposite in direction to the voltage generated by the nominal cold junction of the said tubular thermoelement when heated to the said given temperature and the ratio of the smaller to the larger voltage is on the order of at least 0.5.

8. A thermocouple connected to an energy-receiving circuit comprising a tubular thermoelement and a second thermoelement, said elements having a nominal hot junction between the extremities thereof, said tubular thermoelement enclosing said second thermoelement, the said tubular and second thermoelements being of approximately the same length and having nominal cold junctions at their other extremities in cooperation with said energy-receiving circuit, the nominal cold junction of the said tubular thermoelement enclosing the nominal cold junction of the said second thermoelement, said junctions being formed of metals that will effect a predetermined reversal of current upon cessation of the heat input, and means whereby said tubular thermoelement is adapted to receive heat input supplied the thermocouple only at a point intermediate the extremities of said tubular thermoelement.

9. A thermocouple for supplying energy to a copper circuit including an electromagnet winding, comprising a constantan thermoelement and a Chromel thermoelement, a contiguous extremity of each of said thermoelements being united to provide a nominally hot junction, the other extremity of each of said thermoelements being connected to said copper circuit and providing nominally cold junctions, the said first thermoelement having a source of heat input associated therewith only at a point intermediate of its extremities, the voltage generated by the nominal hot junction of said first thermoelement when heated to a given temperature being opposite in direction to the voltage generated by the nominal cold junction of said element when heated to the same temperature and the ratio of the smaller to the larger voltage being on the order of at least 0.5 to produce the desired operating characteristics upon discontinuance of said flame.

10. A thermocouple for supplying energy to a copper circuit including an electromagnet winding, comprising a Constantan thermoelement and a stainless steel thermoelement, a contiguous extremity of each of said thermoelements being united to provide a nominally hot junction, the other extremity of each of said thermoelements being connected to said copper circuit and providing nominally cold junctions, the said first thermoelement having a source of heat input associated therewith only at a point intermediate of its extremities, the voltage generated by the nominal hot junction of said first thermoelement when heated to a given temperature being opposite in direction to the voltage generated by the nominal cold junction of said element when heated to the same temperature and the ratio of the smaller to the larger voltage being on the order of at least 0.5 to produce the desired operating characteristics upon discontinuance of said flame.

11. A thermocouple connected to an energy-receiving circuit, comprising a first thermoelement and a second thermoelement of dissimilar metals, said elements having a nominal hot junction between the extremities thereof, thermoelements of a third metal dissimilar to both of said first named thermoelements and with which said first named thermoelements form nominal cold junctions at their other extremities in cooperation with said energy-receiving circuit, the said first thermoelement having a source of heat input associated therewith only at a point intermediate the extremities of said first element and having its nominal hot junction of such materials that when heated to a given temperature the voltage generated by said nominal hot junction is opposite in direction to the voltage generated by the nominal cold junction of the said first thermoelement when heated to the said given temperature and the ratio of the smaller to the larger voltage is on the order of at least 0.5.

12. A thermocouple connected to an energy-receiving circuit comprising a first thermoelement and a second thermoelement of dissimilar metals, said elements having a nominal hot junction between the extremities thereof, thermoelements of a third metal dissimilar to both of said first named thermoelements and with which said first named thermoelements form nominal cold junctions at their other extremities in cooperation with the said energy-receiving circuit, the said first thermoelement having a heat receiving and conducting means in heat conducting relationship therewith only intermediate its extremities and having its nominal hot junction of such materials that when heated to a given temperature the voltage generated by the said nominal hot junction is opposite in direction to the voltage generated by the nominal cold junction of the said first thermoelement when heated to the said given temperature and the ratio of the smaller to the larger voltage is on the order of at least 0.5.

13. A thermocouple circuit comprising three elements of dissimilar metals, one of said elements including an electromagnetic coil adapted to transfer electromagnetic energy to an associated control device, a contiguous extremity of the second and third elements being united to provide a nominal hot junction and the junctions of said second and third elements with said first-named element forming nominal cold junctions, said second element being formed of a metal such that when heated to a given temperature the voltage generated by the nominal hot junction is opposite in direction to the voltage generated by its nominal cold junction when heated to said given temperature and the ratio of the smaller to the larger voltage is on the order of at least 0.5 to effect a predetermined reversal of voltage upon cessation of heat input, and a source of heat input to said thermoelectric circuit cooperatively associated with said second element only at a point intermediate of its extremities.

PAUL L. BETZ.